Oct. 5, 1965    M. W. NEWBERRY    3,209,944
DISPENSING APPARATUS
Filed Feb. 11, 1963    3 Sheets-Sheet 1

WITNESSES
Theodore F. Wrobel
James A. Young

INVENTOR
Meigs W. Newberry
Frank Cristiano Jr.

Oct. 5, 1965 M. W. NEWBERRY 3,209,944
DISPENSING APPARATUS
Filed Feb. 11, 1963 3 Sheets-Sheet 3

United States Patent Office 3,209,944
Patented Oct. 5, 1965

3,209,944
DISPENSING APPARATUS
Meigs W. Newberry, East Longmeadow, Mass., assignor to Westinghouse Electric Corporation, Pittsburgh, Pa., a corporation of Pennsylvania
Filed Feb. 11, 1963, Ser. No. 257,618
8 Claims. (Cl. 221—67)

This invention relates to dispensing apparatus for elongated articles of circular cross section, such as bottles, cans and the like, in which the articles are maintained in two vertically staggered, overlapping columns, such two columns also being known as a corded stack, and it has for a primary object to provide an improved mechanism for alternately releasing the lowermost article from one and then the other of the columns.

Another object of the invention is to provide an article releasing mechanism having improved performance.

Another object is to provide an article releasing mechanism in which the weight of the column of articles assists the motor or driving means for the releasing mechanism and does not impose an excessive burden thereon.

Another object is to provide an article releasing mechanism in which scuffing of the articles is avoided.

A further object of the invention is to provide a dispensing mechanism for articles disposed in a corded stack, which mechanism provides protection against theft.

In accordance with the invention, two article support members are disposed in the lower portion of a magazine, one under each column of vertically staggered articles disposed in overlapping or corded relation. Due to the staggered or corded relation, the support member on which the lowermost bottle rests is effective to support all the articles in the two columns. During a dispensing operation, the support member on which the lowermost bottle rests is movable in a more or less horizontal path across the central plane of the magazine and toward the other support member, thereby releasing the lowermost article and permitting the articles in the two columns to move downwardly until the lowermost article in the other column is arrested by the other support member. The one support member is then returned to its original or rest position. During the next dispensing operation, the other support member is operated in a similar manner, that is, it is first moved toward the first support member, thereby releasing the lowermost article and permitting both columns to move downwardly until further motion is arrested by the first support member, and it is then returned to its original or rest position.

The two article support members are preferably pivotally supported at their ends for arcuate movement by pairs of suitable lever structures. The levers may be operated by any suitable operating mechanism of a type that prevents movement of each support rod from its bottle supporting position until it is operated to effect a bottle dispensing operation, whereby there is provided the anti-theft protection hereinafter explained.

In one such mechanism which I have devised and which is disclosed herein, the levers may be individually operated by toggle structure including a pair of levers arranged to form a toggle knee, and, when the levers and the toggle knees are in the rest positions, the toggle knees are in an "overcenter" position arranged in such a manner that the weight of the bottles is transmitted to the toggle structure in a compressive direction, thereby locking the support members in their set position.

Means is further provided for actuating each of the toggle structures in a direction to the other side of center to "break" the knee and thereby permit the associated support member to move across the central plane of the magazine to the other side of the magazine, thereby releasing the lowermost bottle in the columns and permitting the remainder of the articles in the columns to smoothly move downwardly until further motion is arrested by the other support member. With this arrangement, the support members alternately support the corded stack of articles in their rest positions beneath each of the columns. This arrangement provides anti-theft protection, since the support member supporting the stack cannot be moved manually from below the stack to release an article, while the other support member acts as a barrier, manually immovable from below the stack, preventing passage of an article shifted laterally past the member in the stack supporting position.

A suitable mechanism for actuating the levers may include a structure normally disposed out of abutment with, but movable into abutment with, one end of each of the toggle levers to initiate a dispensing operation.

The above and the objects are effected by the invention as will be apparent from the following description and claims taken in connection with the accompanying drawings, forming a part of this application, in which:

Figure 1:
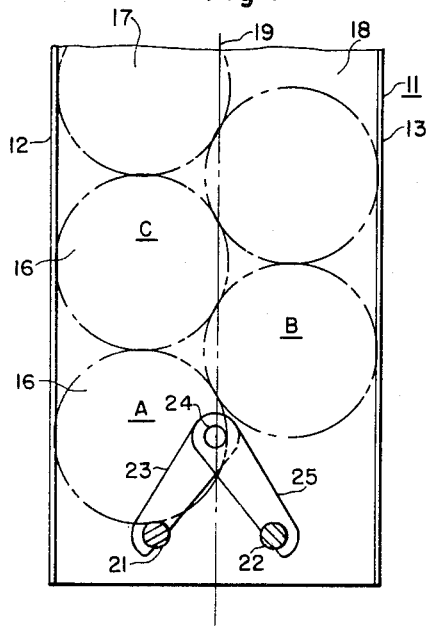
FIGURE 1 is a diagrammatic view of an article releasing mechanism incorporating the invention, the mechanism being shown in the non-dispensing or "at rest" position.

Referring to the drawing in detail, there is shown an article retaining magazine 11 of any suitable height having a pair of vertically extending side walls 12 and 13 (shown in FIGURES 1 to 5) and front and rear walls 14 and 15 (shown in FIGURE 7), and adapted to retain a plurality of elongated articles of circular cross section, such as bottles 16, can, or the like. The side walls 12 and 13 are horizontally spaced from each other to a slightly lesser degree than twice the diameter of the articles, so that the articles are retained in two vertically staggered or overlapping columns 17 and 18, or a corded stack, as illustrated and as well-known in the art.

Referring especially to FIGURE 1, it will be noted that the lowermost article or bottle in the columns, bottle A, is disposed in column 17, and the next-to-lowermost article, bottle B, is disposed in column 18, with bottle C disposed in column 17 directly above the lowermost bottle A. In this arrangement, the central plane 19, that is, the plane parallel to and midway of the walls 12 and 13, intersects, or passes through, the bottles in both columns 17 and 18, at least in the lower portion of the magazine.

Figure 5:
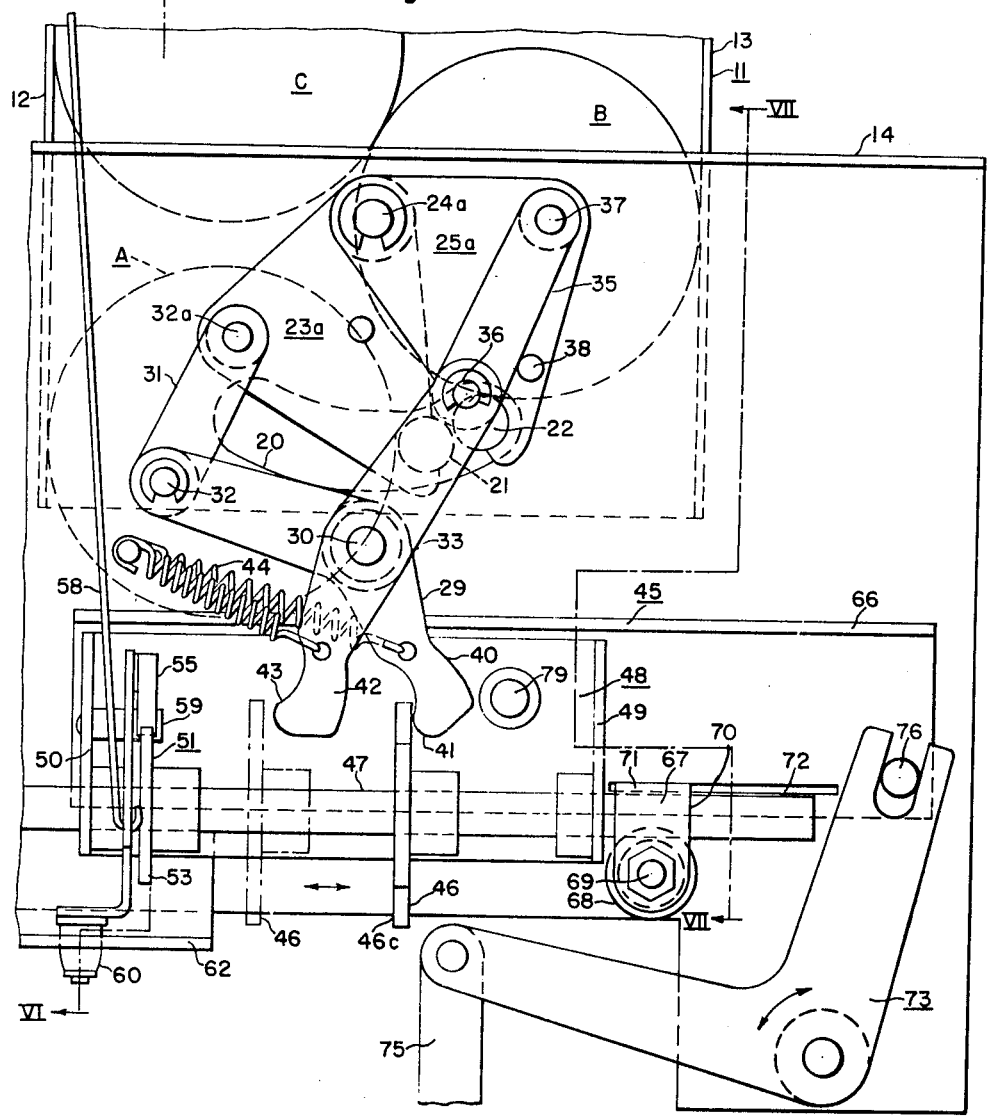
FIGURE 5 is a front view on a larger scale, of dispensing apparatus incorporating the dispensing mechanism illustrated in FIGURES 1 to 4, and further illustrating reciprocable mechanism for alternately actuating the support members of the dispensing mechanism, one of the support members being shown in the dispensing position.
Figure 6:
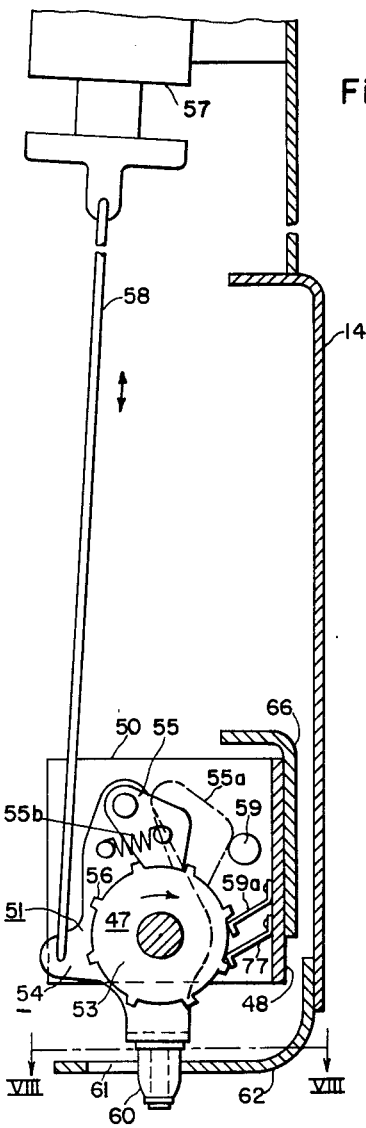
FIGURE 6 is a vertical sectional view taken on line VI—VI of FIGURE 5 but not in dispensing position.
Figure 7:
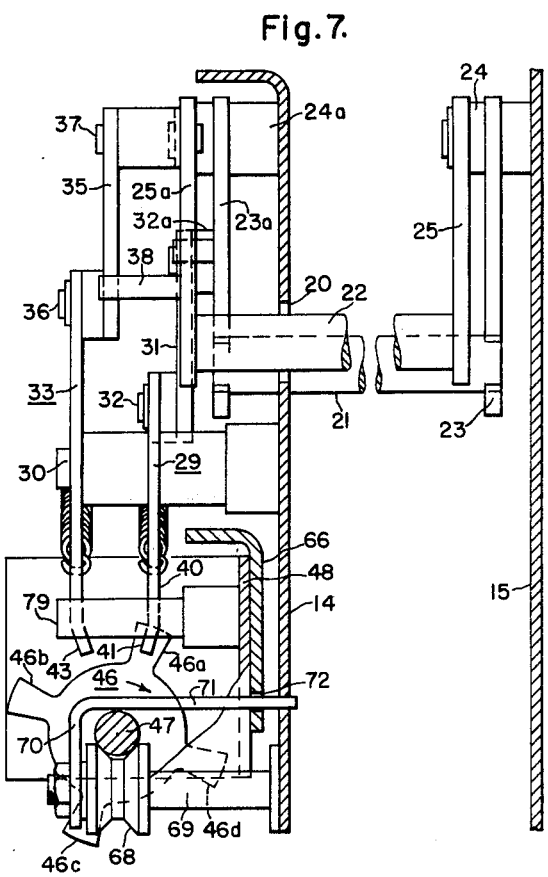
FIGURE 7 is a vertical sectional view taken on line VII—VII of FIGURE 5.

In accordance with the present invention, there is provided a support member 21 disposed in the lower portion of the magazine beneath column 17 for restraining downward movement of the two columns by abutment with the lower surface of bottle A, and there is further provided a support member 22 disposed beneath column 18. The support members are preferably in the form of rods extending from front to rear as shown in FIGURE 7 and extend through a suitable opening 20 in the front wall 14, as shown in FIGURES 5 and 7.

In FIGURE 1, the two support members or rods 21 and 22 are illustrated in the rest positions and are disposed on opposite sides of the central plane 19 and equidistantly therefrom horizontally. With the columns in this position, the support rod 21 is effective to support both columns 17 and 18, the bottles in column 18 being supported by engagement with the bottles in column 17 while the support rod 22 is ineffective to support the columns.

The support rod 21 is pivotally supported from the rear and front walls 15 and 14 by levers 23 and 23a, respectively, for arcuate movement about pivots 24 and 24a disposed on a common horizontal axis in the central plane 19, while the support rod 22 is pivotally supported from said rear and front walls by levers 25 and 25a, respectively, for arcuate movement about the same pivots 24 and 24a, respectively. The rear levers 23 and 25 are preferably of simple elongated shape, while, as shown in FIGURE 5, the front levers 23a and 25a are preferably of generally triangular shape, for a purpose subsequently to be described. It will be noted that each of the mentioned levers extend downwardly from, and each support rod is disposed below the pivots 24 and 24a.

It will be noted that when the two support rods 21 and 22 are in the normal or rest positions shown in FIGURE 1, the levers 23 and 25 are disposed in divergent relation to each other and equiangularly relative the central plane 19. The spacing between each support rod and its associated magazine wall 12 or 13 is less than the diameter of one of the bottles 16, and the spacing between the support rods is also less than the diameter of one of the bottles. Hence, even though the lowermost bottle A should be manipulated from below and shifted laterally to the right (when viewed as in FIGURE 1), it cannot be dropped or dispensed from the magazine. Also, the support rods are manually immovable from below to appreciably alter the spacing described above. This arrangement provides highly desirable anti-theft protection, preventing pilferage of the contents of the apparatus. Expressed in a slightly different manner, each of the support rods is effective, when the lowermost bottle rests thereon, to control the dispensing of such lowermost bottle and to act as an anti-theft barrier when the lowermost bottle rests on the other support rod.

Figure 2:
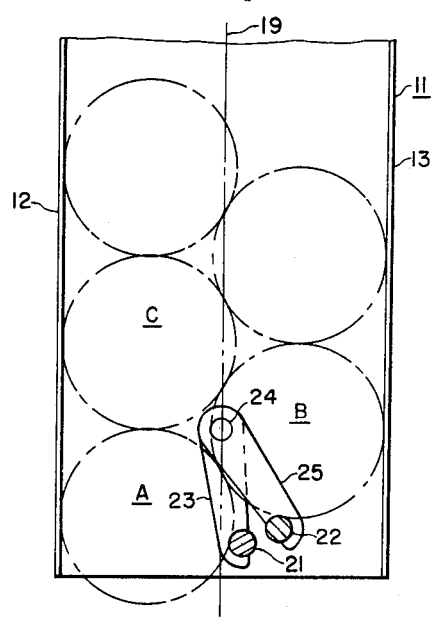
FIGURE 2 is a view similar to FIGURE 1, but illustrating the releasing mechanism in the intermediate position at which the next to the lowermost bottle engages the support member that is not moving.
Figure 3:
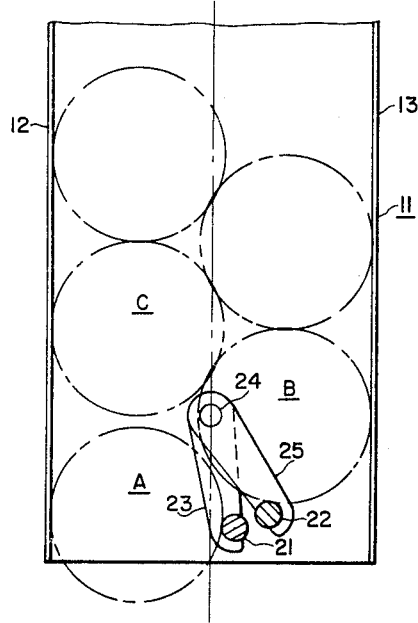
FIGURE 3 is a similar view showing a later intermediate position in which the lowermost bottle has moved downwardly from the bottle above it.
Figure 4:
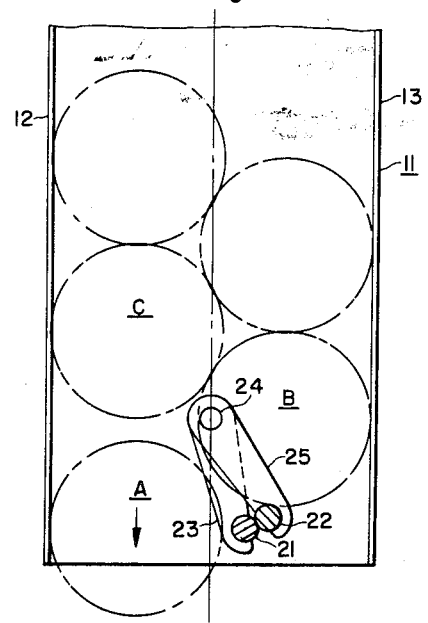
FIGURE 4 is a similar view showing the movable support member at the end of its travel, said lowermost bottle having been released and being shown in the course of its descent.

Since bottle A is lowermost in the columns, it is the first to be dispensed. To dispense bottle A, the lever 23a is rotated in counterclockwise direction about the pivot 24a with a continuous and steady motion, thereby moving the support rod 21 transversely of the plane 19 and to the right, first with a downward motion in the direction indicated by the arrow in FIGURE 1. During such movement, the lower bottle A is smoothly lowered, and together with it, both of the columns 17 and 18, until further downward movement of the bottles above the lowermost bottle A is arrested by abutment of bottle B with the support rod 22, as illustrated in FIGURE 2. Upon further counterclockwise movement of the support rod 21, bottle A moves downwardly free of the weight of the bottles above it. As shown in FIGURE 3, the surface of the bottle A at the point at which it contacts the rod 21 is at only a slight angle to vertical, so that the weight of the higher bottles, if they rested on the bottle A, would impose a great side thrust or wedging action on the rod 21. Upon further movement of the rod 21, the bottle A is fully released and permitted to drop out of the magazine, the bottle A being shown in FIGURE 4 in the course of its descent after having been released. It will be noted that the support rod 21, at the end of its travel shown in FIGURE 4, is spaced from the wall 12 a distance greater than the diameter of the bottle A.

The abutment of the bottle B with the support rod 22 relieves the support rod 21 of the weight of the bottles above the bottle A and, therefore, provides improved performance of the dispensing mechanism. One important result is that after the rod 21 completely releases the bottle A, it does not engage the bottle B. The support rod 21 must move somewhat to the right and upwardly after the bottle A is released in order to allow for manufacturing variations and if the support rod 22 were not present to hold bottle B, then bottle B would drop onto the support rod 21, which would then have to raise the bottle B and the bottles resting thereon a small distance. This would impose a heavy load on the support rod 21 and the mechanism for driving the same. Also, as already explained, when bottle B abuts the support rod 22, the wedging action of the bottle A between the wall 12 and the support rod 21 is reduced to the extent of the weight of the bottles above the bottle A. Thus, this wedging action is reduced just before the point at which it would become the greatest.

After the dispensing operation, the lever 23a is rotated in clockwise direction until the support rod 21 is returned to its original or rest position, as shown in FIGURE 1.

During the next dispensing operation, the support rod 22 is actuated in substantially the same manner, but the direction of movement is reversed, that is, the support rod 22 is rotated about the pivot 24a in clockwise direction to release bottle B, thereby permitting downward movement of the two columns until further motion of the latter is arrested by abutment of bottle C with the support rod 21. Subsequent to dispensing of bottle B, the support rod 22 is returned to its rest position by rotation in counterclockwise direction about its axis.

To permit maximum movement of each support rod during a dispensing operation, it is mounted on its supporting levers in such a position that it extends beyond the edges of the levers facing the other support rod. It will be noted that with this arrangement, during the dispensing operation (for example, as illustrated in FIG. 4) the support rods 21 and 22 abut each other, thereby permitting more freedom for the bottle being dispensed to drop from the magazine.

The support rods 21 and 22 may be operated by any suitable mechanism. However, in FIGS. 5 to 9, inclusive, there is shown novel dispensing apparatus for operating the support rods 21 and 22 sequentially to alternately dispense the lowermost bottle in each of the columns 17 and 18.

Referring to FIG. 5 in particular, it will be noted that the lever 23a is of generally triangular shape and is pivotally supported adjacent its upper apex by the pivot 24a while the support rod 21 is attached thereto adjacent the lower apex. In a similar manner, the lever 25a is pivotally connected adjacent its upper apex to the pivot 24a and the support rod 22 is attached to the lever adjacent its lower apex. The other apex of the lever 23a is connected to a dual linkage, hereinafter referred to as a toggle linkage, including a primary lever 29 pivotally connected at an intermediate point to a stud or pin 30, which in turn is anchored to the front wall 14, and having one end connected to an intermediate link 31 by a pivot 32. The other end of the link 31 is connected to the remaining apex of the lever 23a by a pin 32a.

In a similar manner, the lever 25a is connected to a toggle linkage including a primary lever 33, pivotally connected at an intermediate point to the stud 30 for rotation about the same axis of rotation as primary lever 29, and connected at one end to an intermediate link 35 by a pivot pin 36. The other end of the intermediate link 35 is pivotally connected to the rightward apex portion of the lever 25a by a pivot pin 37.

The lever 29 and the link 31 also form what is known as a "toggle knee," the knee being shown in the "broken" or unlocked position. Similarly, the lever 33 and the link 35 form a toggle knee, the toggle knee being shown in the locked position with the link 35 disposed in abutment with a stop member 38 attached to the lever 25a. In the locked position shown, the axis or center of the pin 36 is disposed slightly to the right of a line through the centers of the stud 30 and the pivot 37. The weight of the bottles in the two columns, acting through the lowermost bottle B, is effective to urge the support rod 22 in clockwise direction about pivots 24a and 24. However, since the axis of the pin 36 is in the overcenter position or to the right of the line through the axes of pivot pins 30 and 37, the primary lever 33 and the intermediate link 35 are disposed in compressive relation with each other and biased against the stop member 38, thereby preventing movement of the support member 22 to the left.

On the other hand, the primary lever 29 and the intermediate link 31, being disposed in the "broken" knee position, position the support rod 21 in the dispensing position shown.

The primary lever 29 is provided with a lower arm portion 40 having a rounded lobe 41. In a similar manner, the primary lever 33 has a lower arm portion 42 having a lobe 43. The primary levers 29 and 33 are individually biased in clockwise direction about the pin 30 by spring members 44. It will be noted that the primary lever 33 is generally of rectilinear shape. However, the primary lever 29 is of non-rectilinear shape, that is, the lower arm 40 is angularly disposed with relation to the remaining portion of the lever. With this arrangement, when the two primary levers 29 and 33 are disposed in the "at rest" or non-dispensing positions (not shown) the lower lever arms 40 and 42 are substantially coincident. This position is obtained when the primary lever 29 is rotated in clockwise direction about pivot pin 30, from the position illustrated in FIG. 5, thereby rotating the lever 23a in clockwise direction about its pivot pin 24a until the support member 21 is returned to its original or rest position (as illustrated in FIG. 1) and the toggle knee is locked.

To effect the next dispensing operation, i.e. to dispense bottle B, the primary lever 33 is rotated in counterclockwise direction about the pivot 30, thereby moving the pivot 36 to the left across the line of centers of the pins 30 and 37 and "breaking" the knee. With the knee thus "broken," the weight of the bottles exerted through the lowermost bottle B is effective to rotate the support rod 22 in clockwise direction to the dispensing position.

The primary levers 29 and 33 are operable in a sequential manner by a reciprocable mechanism 45 comprising an actuating member of wheel 46 mounted upon an elongated shaft 47. The shaft 47 is connected to and supported by an elongated plate member 48 disposed intermediate the front wall 14 and the primary levers 29 and 33, and having a pair of opposed forwardly extending flanges 49 and 50 through which the shaft 47 extends. As best shown in FIG. 7, the actuating wheel 46 is provided with a plurality of, in this instance four, lobes 46a, 46b, 46c, and 46d, equally spaced from each other about the periphery of the wheel 46 and extending radially therefrom. In the position illustrated in FIGS. 5 and 7, the lobe 46a is disposed in alignment with the lobe 41 of the primary lever 29.

A ratchet and pawl assembly 51 is further mounted on the shaft 47 and includes a ratchet wheel 53 drivingly connected to the shaft 47, a bell crank 54 rotatably connected to the shaft 47 and a pawl member 55 carried by the bell crank 54. The pawl 55 is biased, as by a spring 55b anchored to the bell crank 54, in clockwise direction against the ratchet wheel and is arranged to cooperate with the projecting teeth 56 thereon. The ratchet wheel has twice as many teeth as the actuating wheel 46 has lobes, in this instance, eight, and the pawl is arranged to advance the ratchet wheel 53 one-half a tooth space in clockwise direction upon actuation of the bell crank by a suitable solenoid mechanism 57. The solenoid mechanism 57 is connected to the bell crank 54 by a suitable wire link 58. By referring to FIG. 6, it will be noted that, when the solenoid 57 is actuated, the link 58 is pulled upwardly and the bell crank 54 is rotated sufficiently to advance the pawl 55 to the phantom position 55a. Further forward movement of the pawl 55 is prevented by a suitable fixed stop member 59 attached to the plate 48, while reverse movement of the ratchet wheel is prevented by a spring finger 59a.

Figure 8:
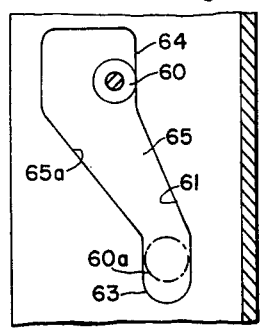
FIGURE 8 is a fragmentary bottom view taken on line VIII—VIII of FIGURE 6.
Figure 9:
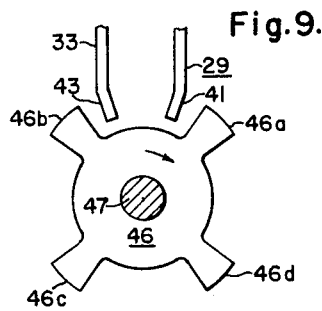
FIGURE 9 is a fragmentary view of a portion of the mechanism shown in FIGURE 7, the mechanism being shown in a non-dispensing or "at rest" position.

The bell crank 54 is further provided with a downwardly extending, radially disposed, cam roller member 60 arranged to extend into a slotted cam-shaped opening 61 provided in a suitable flange member 62 that is attached at one end to the front wall member 14. Referring to FIGURE 8, it will be seen that the slotted cam opening 61 is provided with two opposed end portions 63 and 64 which are disposed in mutually spaced parallel relation and a central inclined portion 65 serving as a connection between the slots 63 and 64 and providing the cam "throw."

The plate member 48 is connected in face-to-face relationship with an elongated support bracket 66 of inverted L-shape in cross-section.

The reciprocable mechanism 45 is supported on front wall 14 by a plurality of support structures 67 (only one shown) comprising a sheave 68 rotatably supported on a stud 69 connected to the front wall member 14, and an inverted L-shaped bracket 70 having a depending end portion attached to the stud member 69 and a horizontally extending portion 71 rigidly connected to the front wall 14. The horizontally extending portion 71 extends through an elongated slot 72 provided in the bracket 66 and is smoothly slidable therein, while the sheave 68 rollably supports the shaft 47.

The reciprocable mechanism 45 may be translated with a horizontal to-and-fro motion by a suitable rocking bell crank 73 having one leg connected to a suitable power actuating device (not shown) by a lever 75, and its other leg connected to the bracket 66 by a slot and pin connection 76.

The extent of travel or stroke of the reciprocable mechanism is indicated by the original position of the actuating wheel 46 (shown in phantom lines) and the position of the wheel 46 at the end of the movement (shown in full lines).

To perform a dispensing operation, for example the dispensing of the bottle A in the left stack 17, the reciprocable mechanism is actuated from the position of rest (as indicated by the phantom view of the actuating wheel 46 in FIGURE 5) to the position shown in full lines in FIGURES 5 and 7, as follows. The solenoid 57 is first momentarily actuated to rotate the bell crank 54 in clockwise direction a sufficient degree to cause the pawl 55 to rotate the ratchet wheel 53 one-half the spacing between adjacent teeth 56, thereby rotating the shaft 47 and the actuating wheel 46 to the position shown in FIGURE 7. During this rotation, the wide slot portion 64 permits the roller 60 to move to the left accordingly. In this position, the lobe 46a is disposed in alignment with the lobe 41 of the primary lever 29. Subsequent thereto, the reciprocable mechanism 45 is translated to the right by the rocking movement of the bell crank 73 in clockwise direction. During the initial portion of this movement, the toggle mechanism 29, 31 is moved to the other side of the overcenter position, thereby "breaking" the toggle knee and then the lever 23a is rotated counterclockwise through the link 31 to drive the article support rod 21 to the right to the dispensing position shown in FIGURE 5.

As the reciprocable mechanism is moved to the right by the bell crank 73, the cam roller 60 also moves to the right and at the same time moves from the position shown in full lines in FIGURE 7 to the position 60a shown in phantom lines therein. That is, it is moved from the slot portion 64 to the slot portion 65, then into abutment with the edge 65a of the slot portion 65 and is finally urged to the right into the slot portion 63. During such movement, the cam roller 60 rotates the bell crank 54 in the opposite or counterclockwise direction a distance equal to the distance or spacing between adjacent teeth 56, thereby allowing the pawl member 55 to ride rearwardly over one of the teeth 56. Upon the return stroke, the reciprocable mechanism is translated to the left (when viewed as in FIGURE 5) and, during such movement, the cam roller 60 is moved from the phantom position 60a back to the full line position 60 shown in FIGURE 8, thereby rotating the bell crank 54 in forward direction and advancing the ratchet wheel 53 a distance equal to one-half of the spacing between adjacent teeth. Reverse rotation of the ratchet wheel 53 from this position is prevented by a spring finger 77. As the ratchet wheel advances, it rotates the shaft 47 and the actuating wheel 46 to the position shown in FIGURE 9, wherein the lobe 46a has been moved in clockwise direction one-half a tooth space beyond the lobe 41 of the toggle mechanism 29, 31 and lobe 46b has been advanced to a position within a half tooth space of the lobe 43 of the other toggle mechanism 33, 35. It will be noted that, when the actuating wheel 46 is rotated to the position shown in FIGURE 9, neither of the toggle levers 29 and 33 may be actuated, even though the shaft 47 is translated axially by unauthorized manipulation or accident, since both of the levers are out of registry with the lobes on the actuating wheel 46 if the solenoid 57 has not been actuated. This is a highly desirable feature, since it further protects the apparatus against theft of its contents.

The primary lever 29 of the toggle mechanism 29, 31 is restored to its original position, upon movement of the reciprocable mechanism to the left, by the force of its spring 44 augmented by the abutment of a roller 79 attached to the plate 48 and disposed to the right of the actuating wheel 46, as best illustrated in FIGURE 5. During such return movement, the roller 79 is brought into abutment with the arm portion 40 of the primary lever 29, thereby insuring that movement of the lever 29 in clockwise direction is continued until the primary and secondary levers 29 and 31 are moved into the over-center position and the bottle support rod 21 is moved in clockwise direction to the original "at rest" position, as illustrated in FIGURE 1. A further function of the roller member 79 is to prevent movement of the primary lever 29 in counterclockwise direction during the dispensing operation at a rate faster than that of the reciprocable mechanism, thereby insuring that the dispensing of the bottles is obtained in a smooth and safe manner. The roller member 79 also serves to prevent actuation of the toggle mechanisms when the reciprocable mechanism 45 is in the rest position.

In the subsequent dispensing operation, the bottle B is dispensed by a procedure substantially the same as hereinabove described. That is, the solenoid 57 is momentarily actuated to rotate the ratchet wheel 53 in clockwise direction one-half the spacing between adjacent teeth 56, thereby moving the lobe 46b on the actuating wheel 46 into registry with the primary lever 33. Accordingly, as the reciprocable mechanism 45 is translated to the right, the actuating wheel 46 engages the lobe 43 of the primary lever 33 and rotates the same in counterclockwise direction about pivot 30 to "break" the toggle knee and permit the article support rod 22 to rotate in clockwise direction a degree sufficient to release the bottle B from the column 18. Here again, during the return stroke of the reciprocable mechanism, the cam roller 60 is effective to advance the actuating wheel 46 an amount equal to one-half the spacing between the teeth 56 so that, at the end of the dispensing operation, none of the lobes are in engagement or in alignment with either of the primary levers 33 and 29. During the return stroke, the primary lever 33 is returned to its original position as illustrated in FIGURE 5.

It will now be seen that the invention provides a highly improved arrangement for lowering and dispensing articles of generally circular cross section disposed in vertically stacked relation with each other, and for reducing the tendency of the weight of the articles to wedge the lowermost article between its support rod and the associated magazine wall.

It will further be seen that the invention provides a dispensing mechanism having highly reliable anti-theft protection characteristics without requiring special barrier members employed solely for anti-theft protection.

The invention also provides a dispensing mechanism that may be actuated by mechanism of simple and rugged design, yet effective, to lower and dispense the articles smoothly and with danger of damage thereto, especially when such articles are of a frangible nature, such as glass bottles.

Although the invention is shown and described in connection with a magazine holding two columns of articles, it will be understood that the invention may be incorporated in apparatus for dispensing articles from any desired number of columns in any desired sequence, merely by suitable modification of the ratchet and pawl assembly 51 and the actuating wheel or wheels 46.

I claim as my invention:

1. Article dispensing apparatus comprising a magazine having a pair of spaced vertically-extending side walls,
   first and second support members in said magazine disposed, when in their rest positions, on opposite sides of a central plane midway between said side walls,
   means for mounting each of said support members for pivotal movement about a common axis disposed above the support members and in said central plane,
   actuating means for effecting pivotal movement of each support member from its position of rest downwardly and transversely of said central plane to a position adjacent the other support member and then back to its rest position while the other support member remains in its rest position.

2. Article dispensing apparatus comprising a magazine having a pair of spaced vertically-extending side walls,
   first and second support members in said magazine disposed, when in their rest positions, on opposite sides of a central plane midway between said side walls,
   means including a lever for mounting each of said support members for pivotal movement about a common axis disposed above the support members and in said central plane, actuating means for effecting pivotal movement of each support member from its position of rest downwardly and transversely of said central plane to a position on the opposite side of said central plane and adjacent the other support member and then back to its rest position while the other support member remains in its rest position.

3. In dispensing apparatus having a magazine provided with a pair of spaced vertically-extending side walls adapted to confine therebetween first and second columns of articles in staggered relationship, the improvement comprising,
   first and second support members disposed at horizontally spaced rest positions beneath said first and second columns, respectively, and arranged to alternately engage the lowermost article in the columns to restrain both columns from downward movement,
   means supporting said first and second support members for transverse movement relative to said side walls, said first and second support members being disposed below said supporting means, means for actuating said first support member from its rest position toward said second support member to release the lowermost article and then back to its rest position while said second support member remains in its rest position, and means for actuating said second support member from its rest position toward said first support member to release the lowermost article and then back to its rest position while said first support member remains in its rest position.

4. Article dispensing apparatus comprising a magazine having a pair of spaced vertically extending side walls, first and second support members in said magazine disposed, when in their rest positions, on opposite sides of a central plane midway between said side walls, means for mounting each of said support members for pivotal movement about an axis disposed above the support member, each support member being movable transversely of said central plane to a dispensing position adjacent the other support member and then back to its rest position, first and second toggle linkage structures for effecting pivotal movement of said first and second support members, respectively, and means for actuating said first and second linkage structures alternately in a sequential manner to move each support member from its rest position to its dispensing position and then back to its rest position.

5. The structure recited in claim 4 in which said actuating means includes an actuating member having at least one lobe portion, means for rotating said actuating member in a step-by-step manner to position said lobe portion into alignment with one of said toggle linkage structures and out of alignment with the other of said toggle link structures, and means for translating said actuating member in a direction to effect engagement of said lobe and said one toggle linkage structure.

6. Article dispensing apparatus comprising a magazine having a pair of spaced vertically extending side walls, first and second support members in said magazine disposed, when in their rest positions, on opposite sides of a central plane midway between said side walls, means including first and second levers for mounting said first and second support members, respectively, for pivotal movement about an axis disposed above the support member, actuating means for effecting pivotal movement of each support member while the other support member remains in its rest position, said actuating means including an actuating member having at least one lobe portion, means for moving said actuating member in a step-by-step manner to position said lobe portion into cooperative association with said first lever and out of cooperative association with said second lever, and means for moving said actuating member in a manner to effect movement of said first lever, said support members, said mounting means and said actuating means being so constructed and arranged relative to each other as to effect movement of each support member from its position of rest transversely of said central plane to a position on the opposite side of said central plane and adjacent the other support member and then back to its rest position while said other support member remains in its rest position.

7. In dispensing apparatus having a magazine provided with a pair of spaced vertically-extending side walls adapted to confine therebetween first and second columns of articles of circular cross-section in staggered relationship, the improvement comprising, first and second support members disposed at rest positions beneath said first and second columns, respectively, and arranged to alternately engage the lowermost article in the columns to support and restrain both columns from downward movement, said first and second support members, when in the rest positions, being horizontally spaced from each other a distance less than the diameter of one of the articles, each of said support members acting as a barrier preventing passage of an article therepast when the other of said support members is in column supporting position, means pivotally supporting said first and second support members about a common axis for arcuate movement transverse to said side walls, means for actuating said first support member from its rest position toward said second support member to release the lowermost article and then back to its rest position while said second support member remains in its rest position, and means for actuating said second support member from its rest position toward said first support member to release the lowermost article and then back to its rest position while said first support member remains in its rest position.

8. Article dispensing apparatus comprising a magazine structure for holding a plurality of columns of articles, first and second support members pivotally mounted beneath said columns for supporting and releasing articles in the columns, means, including a lever, for effecting movement of each support member from a rest position in which it supports the article thereabove to a dispensing position in which it releases said article in the column, and a horizontally disposed rotatable and axially movable shaft having at least one lobe thereon, said levers and said at least one lobe being so disposed relative to each other that, in different angular positions of the shaft, different levers are disposed in alignment with a lobe on the shaft, and each lever being adapted, when actuated by a lobe in alignment therewith, upon axial movement of said shaft, to move its associated support member from rest or supporting position to releasing position.

References Cited by the Examiner

UNITED STATES PATENTS

| 2,369,882 | 2/45 | Brock | 221—67 |
| 2,615,773 | 10/52 | Holt et al. | 221—67 |
| 2,878,961 | 3/59 | Voorhees et al. | 221—16 |
| 3,146,907 | 9/64 | Bookout | 221—67 |

LOUIS J. DEMBO, *Primary Examiner.*

RAPHAEL M. LUPO, *Examiner.*